June 17, 1952 — G. W. JOHNSON — 2,600,541

UTENSIL WASHING MACHINE

Filed Oct. 21, 1946 — 4 Sheets-Sheet 1

INVENTOR,
Gordon W. Johnson.
BY Roy E. Hamilton,
Attorney.

June 17, 1952  G. W. JOHNSON  2,600,541
UTENSIL WASHING MACHINE
Filed Oct. 21, 1946  4 Sheets-Sheet 2
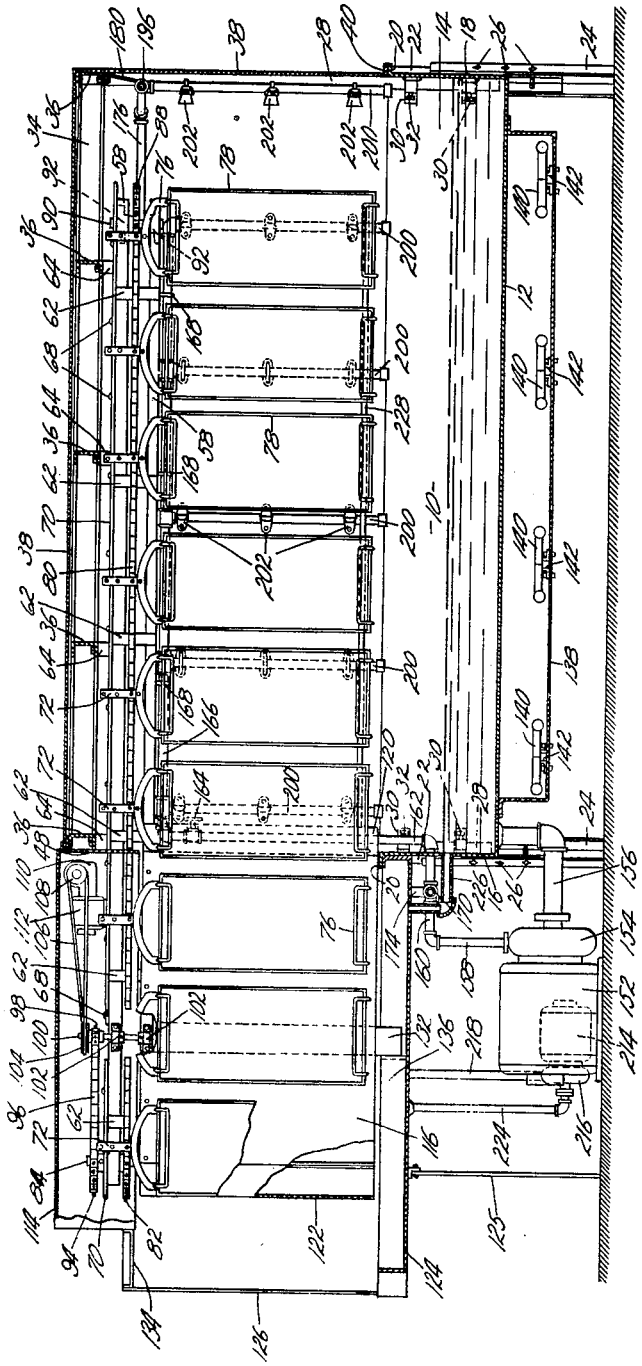
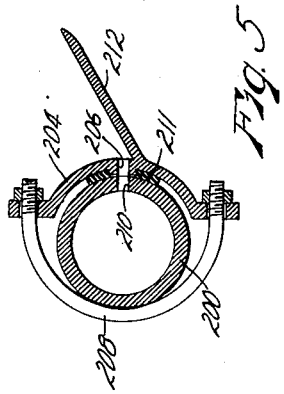
INVENTOR,
Gordon W. Johnson.
BY
Roy E. Hamilton,
Attorney.

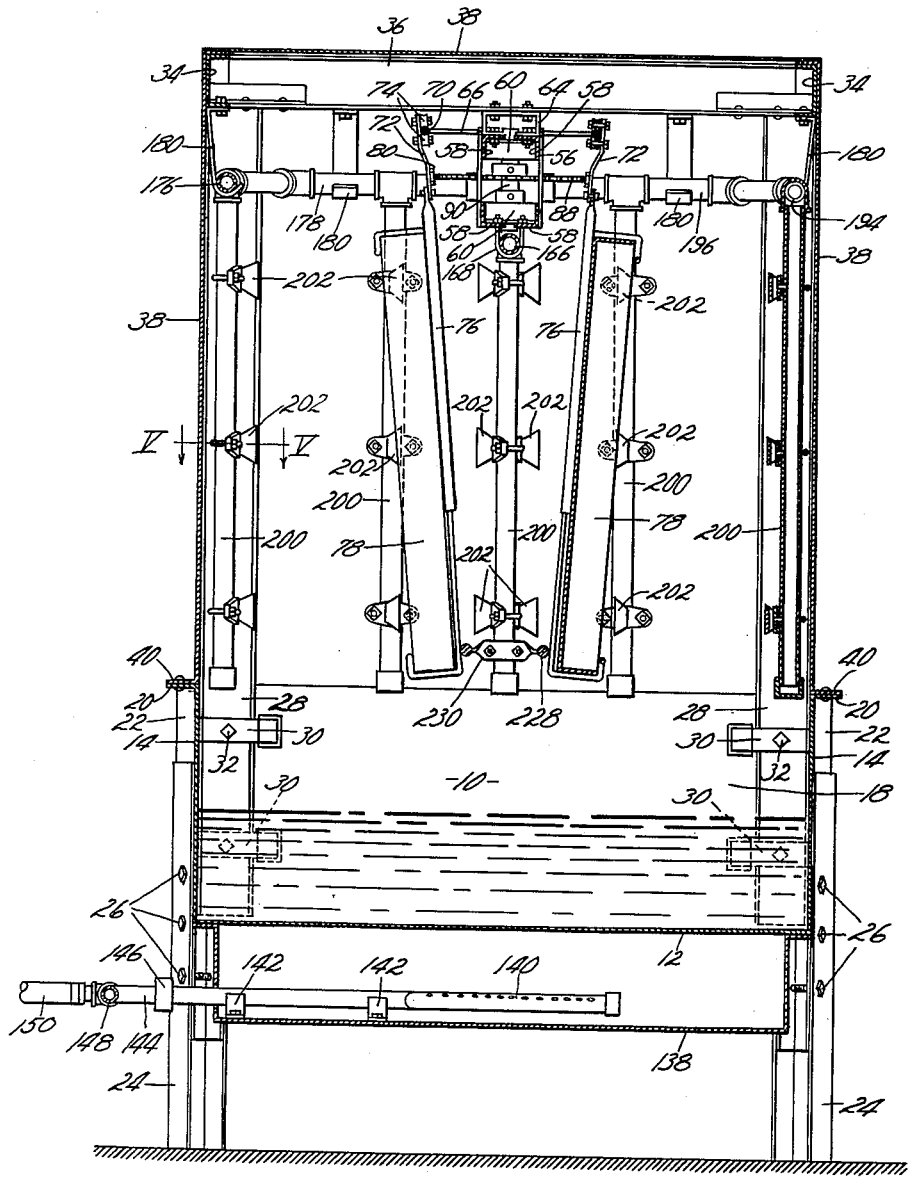

Patented June 17, 1952

2,600,541

UNITED STATES PATENT OFFICE 2,600,541

UTENSIL WASHING MACHINE

Gordon W. Johnson, Raytown, Mo., assignor to Gordon Johnson Company, Kansas City, Mo., a corporation of Missouri Application October 21, 1946, Serial No. 704,775

1 Claim. (Cl. 134—125)

This invention relates to new and useful improvements in utensil washing machines, and has particular reference to utensil washing machines wherein the utensils are carried through the machine on an endless conveyor line.

The principal object of the present invention is the provision of a washing machine wherein utensils placed on an endless conveyor line are carried through a washing cabinet wherein they are washed by a plurality of knife-edged sprays of hot washing fluid.

Another object is the provision of a means whereby the washed utensils may be sterilized by means of sprays of sterilizing fluid.

A further object of the present invention is the provision of a soaking cabinet for use in conjunction with said washing cabinet, wherein dirt or other foreign matter encrusted on the utensils to be washed may be loosened by means of soaking with hot water.

Other objects are simplicity and economy of construction, ease of operation, and adaptability for use to wash a wide variety of utensils.

With these objects in view, as well as other objects which will appear during the course of the specification, reference will be had to the drawings, wherein:

Fig. 2 is a vertical section taken on line II—II of Figure 1 with the loading rack cover partially broken away to show the conveyor line driving system.

Fig. 4 is an enlarged fragmentary vertical section taken on line IV—IV of Figure 1.

Fig. 5 is an enlarged fragmentary horizontal section taken on line V—V of Figure 4, showing the method used in attaching the spray heads to the spray tubes.

Figure 1:
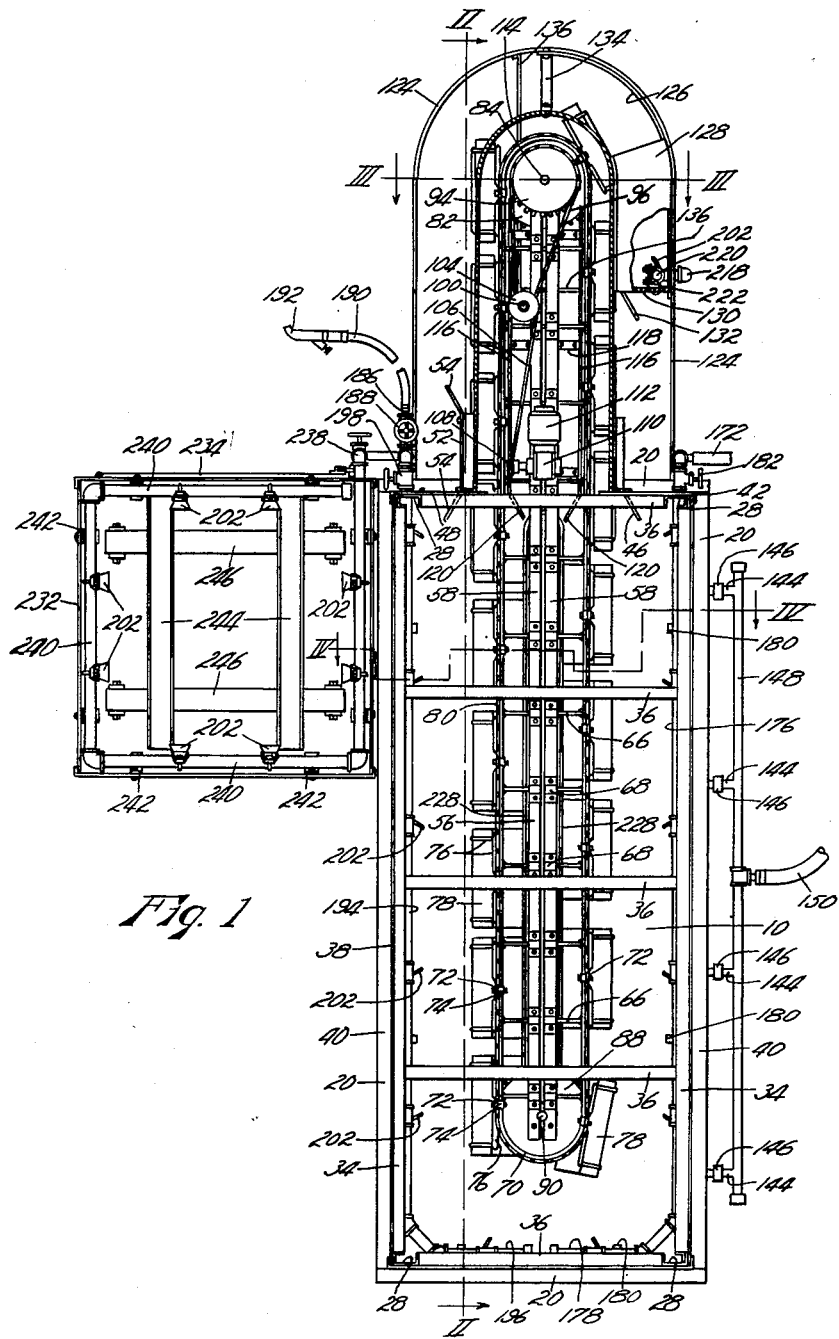
Figure 1 is a plan view of a utensil washing machine embodying the present invention, with the top panels of the washing cabinet, loading rack, and soaking cabinet removed.

It will be noted that the drawings illustrate incubator trays being washed in the machine, being suspended from the conveyor on holding devices specially adapted to receive them. However, by the use of holding devices of various designs, many types of utensils may be supported for washing in the nachine.

Like reference numerals apply to similar parts throughout the several views, and the numeral 10 applies to a rectangular tank, open at the top and having a bottom 12, sides 14, front 16, and back 18, said sides, front and back having an outwardly extending flange 20 at the upper edges thereof. Welded to the outer side of said tank at each of the four corners thereof is an inner leg 22. Slidably movable on each of said inner legs is an outer floor engaging leg 24, which may be fixed on said inner leg by means of bolts 26, which pass through said inner and outer legs. The elevation of said tank above the floor may thus be adjusted.

Corner supports 28, rigidly fastened to said tank at each corner thereof by means of brackets 30 and bolts 32, and extending upwardly from said tank, carry at their upper ends a horizontal frame comprising side members 34 and transverse connecting members 36 extending between and rigidly fastened to said side members.

Supported by said corner supports and said horizontal frame is a washing cabinet 38, said cabinet being of rectangular box-like shape open at the bottom and having an outwardly extending flange 40 formed around the lower edge thereof, said flange being rigidly fastened to flange 20 of tank 10. The forward face of said washing cabinet is partially open, and comprises upper left front panel 42, lower left front panel 44 having an inwardly extending wide beveled flange 46, and upper right front panel 48. In place of a lower right front panel is a hinged access door 50, and hinged to the outer edge of said door is a splash guard 52, said splash guard having wide beveled flanges 54 formed at the forward and rear edges thereof.

A box type beam 56 comprising four angle irons 58 connected by horizontal connecting bars 60 and vertical connecting bars 62, is rigidly fixed to transverse connecting members 36 at the mid-points thereof, and suspended therebeneath by means of brackets 64. Said beam extends forwardly from washing cabinet 38. Support rods 66, rigidly fixed to the upper surface of beam 56 by means of brackets 68 and extending outwardly from the sides thereof, support at their outer ends a conveyor rail 70, said rail consisting essentially of an endless loop of rod-like material.

A plurality of carrier members 72 are carried for movement along said rail by means of a pair of concave rollers 74 carried for rotation by each of said carrier members. Said concave rollers of each of said carrier members are positioned on diametrically opposite sides of said conveyor rail, and thereby prevent said carrier member from leaving the rail in whatever direction force may be applied to it.

To the downwardly extending end of each of said carrier members is attached a holding device for whatever utensil is to be washed. The drawings illustrate a holding device 76 adapted to carry an incubator tray 78.

Figure 3:
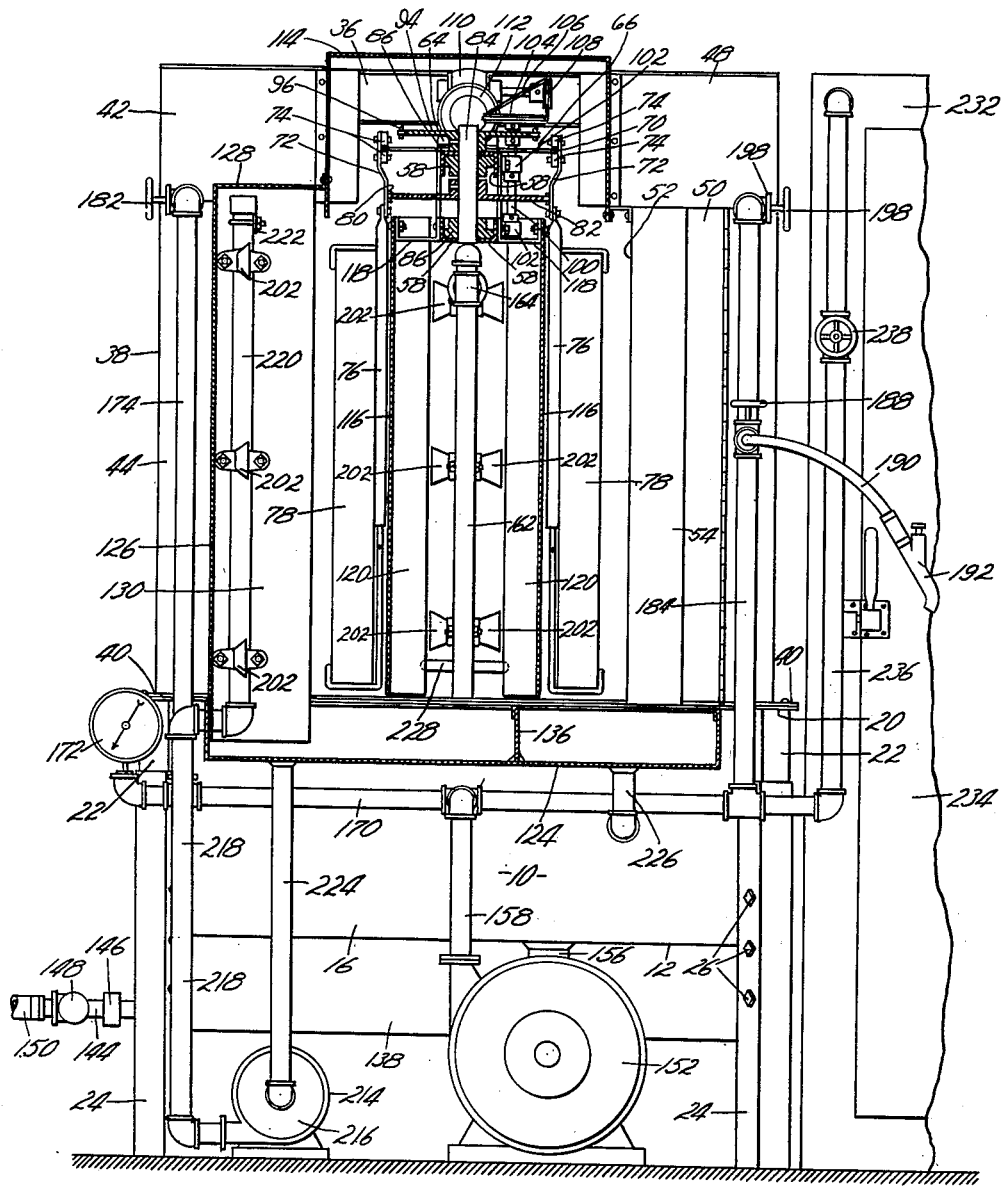
Fig. 3 is an enlarged fragmentary vertical section taken on line III—III of Figure 1.

Carrier members 72 are maintained in substantially equally spaced relationship on rail 70 by means of an endless chain 80 to which each of said carrier members is fixed at a point intermediate rollers 74 and its lower end, and which is positioned substantially beneath rail 70. At the forward end of the loop thus formed, said chain is operatively engaged by sprocket 82, said sprocket being rigidly attached to shaft 88 carried for rotation in bearings 86 mounted in beam 56, as shown in Figure 3. At the rearward end of the loop formed by said chain, said chain is operatively engaged by sprocket 88 rigidly mounted on shaft 90 carried for rotation in bearings 92 mounted in beam 56 similarly to bearings 86.

To the upwardly extending end of shaft 84 is rigidly attached a sprocket 94, operatively connected by means of chain 96 with sprocket 98 rigidly attached to shaft 100 carried for rotation in bearings 102 rigidly mounted on beam 56 at a point rearward of the forward end of said beam. To the upwardly extended end of shaft 100 is rigidly attached a pulley 104, operatively connected by means of belt 106 with pulley 108 mounted on the output shaft of gear reducer 110. Said gear reducer is directly connected with motor 112, which is mounted on the upper surface of beam 56 at a point forward of washing cabinet 38.

The portion of beam 56 extending forwardly from washing cabinet 38, and the conveyor drive system mounted thereon, are covered by loading rack cover 114, which is rigidly attached to upper right front panel 48 and upper left front panel 42, and which extends forwardly therefrom. Two panels 116 extending rearwardly from a point adjacent the forward end of beam 56 to the forward end of washing cabinet 38, and fastened at their upper edges to beam 56 by means of brackets 118, serve to separate holding devices 76 suspended from opposite reaches of conveyor rail 70. At the rearward edges of said panels are formed inwardly extending beveled flanges 120, and the forward edges of said panels are joined by a rounded nosepiece 122.

A drain pan 124 is firmly fixed to the front 16 of tank 10 at the upper edge thereof and extends forwardly, having a rounded forward end, and is supported at a point adjacent its forward end by a floor engaging leg 125 rigidly fixed to the under side thereof.

A sterilizing spray chamber is formed by curved panel 126, which is attached at its lower edge to drain pan 124 around the left front portion thereof. The upper edge of said panel adjacent the rearward end thereof is turned inwardly to form a top 128 for said chamber, said top being fastened to loading rack cover 114. The rearward edge of said panel is turned inwardly to form a back 130 for said chamber, the inward edge of said back being equipped with a rearwardly extending beveled flange 132. The forward upper corner of said panel is fastened to loading rack cover 114 by means of bracket 134. The left forward portion of drain pan 124 is separated from the remainder of the pan by partition 136 in order to form a separate drain pan for said sterilizing spray chamber.

A fire box 138 is rigidly fixed beneath tank 10 and carries therein a plurality of gas burners 140 supported by brackets 142 rigidly fixed to the bottom of said fire box. Pipes 144 supplying gas to said burners extend outwardly from said fire box where each of said pipes is equipped with a mixing chamber 146, the outer ends of said pipes being connected with a common header 148 to which gas is supplied from any suitable source through hose 150.

A motor 152 resting on the floor beneath drain pan 124 is connected directly to pump 154. The intake pipe 156 of said pump is connected directly with tank 10 through the bottom 12 thereof. Vertical delivery pipe 158 of said pump is interconnected at its upper end with horizontal pipe 160 which extends into tank 10 through front 16 at the upper edge thereof, and which is connected at its inner end with vertical pipe 162. Said pipe is equipped with a valve 164 adjacent the upper end thereof, and is connected at its upper end with horizontal pipe 166 which extends beneath beam 56 and is suspended therefrom by U-bolts 168.

Interconnected with pipe 160 at a point outside of tank 10 is a pipe 170 extending transversely beneath drain pan 124 having a pressure gauge 172 connected at its left end, and being interconnected at a point adjacent its left end with vertical pipe 174 which extends upwardly adjacent the front left corner of washing cabinet 38. Said pipe is connected at its upper end with horizontal pipe 176 extending into said cabinet through front panel 42 and extending the length of said cabinet adjacent the left side thereof and having an angled extension 178 at its rearward end which extends partially across said cabinet adjacent the rearward end thereof. Pipes 176 and 178 are supported by a plurality of brackets 180 attached to the left side frame member 34, and pipe 176 is equipped at a point outside of and adjacent to washing cabinet 38 with a valve 182.

The right end of pipe 170 is connected with a vertical pipe 184, extending upwardly adjacent the right front corner of washing cabinet 38, and having interconnected intermediate its ends a pipe 186 having a valve 188 therein and connected at its opposite end with flexible hose 190, said hose carrying at its free end a manually operable nozzle 192. The upper end of pipe 184 is connected with horizontal pipe 194 extending into washing cabinet 38 through front panel 48 and extending the length of said cabinet adjacent the right side thereof and having an angled extension 196 at its rearward end which extends partially across said cabinet adjacent the rearward end thereof. Pipes 194 and 196 are supported by brackets 180 attached to the right side frame member 34, and pipe 194 is equipped with a valve 198 at a point outside of and adjacent washing cabinet 38.

Interconnected with pipes 166, 176 178, 194 and 196 in spaced relationship, are a plurality of downwardly extending spray pipes 200, each of said pipes being equipped with a plurality of spaced spray heads 202 attached to said spray pipes as shown in Figure 5. A spray head body member 204 having a hole 206 therein, is clamped to spray pipe 200 by U-bolt 208 so that hole 206 registers with a hole 210 provided in said spray pipe. A gasket 211 is provided between said body member and said pipe to prevent leakage. A deflecting plate 212 integral with body member 204 deflects water passing through hole 206 into a thin divergent sheet adapted to wash utensils carried through said sheets of water by the conveyor system.

Motor 214, resting on the floor beneath drain pan 124, is directly connected to pump 216. Delivery pipe 218 of said pump is interconnected at its upper end with spray pipe 220, which extends upwardly in sterilizing spray chamber formed by panel 126, and is rigidly attached to the back 130 of said chamber by means of bracket 222. Said spray pipe is provided with a plurality of spray heads 202 attached to said pipe at spaced intervals and adapted to direct sprays of disinfecting fluid against utensils carried through said chamber by the conveyor system. The portion of drain pan 124 isolated by partition 136 is connected by means of pipe 224 with the intake of pump 216. The remainder of drain pan 124 communicates with tank 10 by means of drain pipe 226.

Interference of holding device 76 and the utensils carried thereby with the spray heads carried by central supply pipe 166 are prevented by a guard rail 228 in the form of an elongated loop, which is rigidly connected to spray pipes 200 depending from pipe 166, at a point adjacent the lower ends thereof, by means of brackets 230, as shown in Figure 4.

A soaking cabinet 232 rests on the floor adjacent the right front corner of washing cabinet 38, and has a door 234 in the forward side thereof. A vertical pipe 236, interconnected at its lower end with pipe 170 and having a valve 238 intermediate its ends, is connected at its upper end with a spray pipe 240. Said pipe extends into said cabinet adjacent the top thereof, and extends therein around the four sides of said cabinet, as shown in Figure 1, being supported by means of brackets 242 rigidly fixed to the sides of said cabinet. A plurality of spray heads 202 are carried by said pipe at spaced intervals around said cabinet. A pair of channel irons 244 adjustably supported adjacent the floor of said cabinet by members 246 serve as tracks on which a cart carrying utensils to be soaked may be rolled into the cabinet through door 234.

The operation of the utensil washing machine is substantially as follows:

Water or other washing fluid contained in tank 10 is heated by gas burners 140. Water flows from said tank through pipe 156 to pump 154. Said pump, driven by motor 152, forces the water through pipes 158, 170, 174, 176, 162, 166, 184, 194 and 200 to spray heads 202 contained in washing cabinet 38. The volume of water supplied to said spray heads may be controlled by valves 164, 182 and 198. Said pump, through pipes 158, 170, 236, and 240, also supplies heated washing fluid to spray heads 202 carried in soaking cabinet 232, the volume of said fluid being controlled by valve 238. Pump 216, driven by motor 214, receives sterilizing fluid from the portion of drain pan 124 isolated by partition 136 through pipe 224, and delivers it through pipes 218 and 220 to spray heads 202 contained in sterilizing spray chamber formed by panel 126.

If the incubator trays 78 or other utensils to be washed are so encrusted with dirt or other matter as to require soaking, they are placed on a suitable cart and the cart rolled into soaking cabinet 232 on tracks 244. When the dirt has been sufficiently loosened by the sprays of hot water from spray heads 202, said trays are removed from the soaking cabinet, and the operator may then rinse away any loosely clinging foreign matter by means of a stream of water from manually operated nozzle 192.

Motor 112, through pulley 108, belt 106, pulley 104, sprocket 98, chain 96, and sprocket 94, causes sprocket 82 to turn, thus causing conveyor chain 80 to advance around sprockets 82 and 88. Said chain advances carrier members 72 and holding devices 76 along conveyor rail 70 on rollers 74.

The operator, standing to the right of drain pan 124, loads a tray 78 or other utensil onto each holding device 76 as said holding device passes that point. The utensil is then carried into washing cabinet 38. Possible catching of said tray or holding device on the edges of splash guard 52, access door 50, or panel 116 is prevented by wide beveled flanges 54 of said splash guard, and by beveled flange 120 of panel 116. After said tray and holding device has passed entirely inside of cabinet 38, the lower end of said tray is prevented from swinging inwardly and catching on spray heads 202 by means of guard rail 228. Said tray is then carried rearwardly along the right side of cabinet 38 and forwardly along the left side, passing at all times between opposing streams of water from spray heads 202. These streams may be of high pressure, and as previously described, have the form of thin sheets. A cutting or knife edge of water is thus formed which is very effective for removing grease and encrusted foreign matter from the utensils being washed.

As trays being washed leave cabinet 38, possible catching of said trays on the rearward edge of panel 116 or the edge of front panel 44 is prevented by beveled flange 120 of panel 116 and beveled flange 46 of front panel 44. What water did not drain from said trays while they were still in washing cabinet 38 then drains into drain pan 124, and from there passes through drain pipe 226 into tank 10. There the water is reheated and recirculated through pump 154 as described.

As tray 78 continues forward it enters the sterilizing spray chamber formed by panel 126 and is sprayed therein with sterilizing fluid from spray heads 202. Said fluid, draining from the sterilized tray, falls into the portion of drain pan 124 isolated by partition 136, and from there it returns through pipe 224 to pump 216 and is recirculated.

As said tray is advanced past the forward end of panel 126, it is removed from holding device 76 by the operator, thus leaving said holding device free to receive another tray 78.

Features of the present invention are the long travel of the utensils in a comparatively small cabinet, obtained by forming the conveyor system in an elongated flat loop, the inclusion of both washing and sterilizing means in a single machine, and the provision of soaking and washing cabinets using a common recirculating system of hot washing fluid.

The improvements I claim as new and desire to protect by Letters Patent are:

In a washer machine for rectangular pan-like utensils, a hollow, up-right cabinet; a continuous, horizontal conveyor chain mounted in the cabinet near the top thereof; an open top liquid receptacle in said cabinet spaced below the conveyor chain; a plurality of utensil supports mounted on the conveyor chain and depending therefrom above said receptacle; spray heads arranged within the cabinet for directing liquid against utensils carried by said supports and moved continuously by the conveyor chain;

means for recirculating liquid from the receptacle to said spray heads; means for holding the utensils mounted on the supports in a position inclined with respect to the vertical inwardly toward a central vertical plane through the cabinet; and guide means substantially on said vertical plane for limiting the extent of movement of said utensils toward said vertical plane.

GORDON W. JOHNSON.

REFERENCES CITED

The following references are of record in the file of this patent:

UNITED STATES PATENTS

| Number | Name | Date |
|---|---|---|
| 642,634 | Schreiber | Feb. 6, 1900 |
| 900,528 | Haller | Oct. 6, 1908 |
| 1,045,079 | Prunier et al. | Nov. 19, 1912 |
| 1,212,171 | Beardsley | Jan. 16, 1917 |
| 1,281,864 | Sparr | Oct. 15, 1918 |
| 1,439,177 | Loepsinger | Dec. 19, 1922 |
| 1,520,929 | Burhorn | Dec. 30, 1924 |
| 1,525,558 | Larsen | Feb. 10, 1925 |
| 1,531,768 | Valerius et al. | Mar. 31, 1925 |
| 1,664,637 | Merseles et al. | Apr. 3, 1928 |
| 1,674,064 | Ridley | June 19, 1928 |
| 1,708,694 | Fischer | Apr. 9, 1929 |
| 1,775,003 | Soelch | Sept. 2, 1930 |
| 1,932,827 | Morris et al. | Oct. 31, 1933 |
| 2,399,267 | Szatyn | Apr. 30, 1946 |
| 2,410,934 | French | Nov. 12, 1946 |
| 2,413,853 | Zademach et al. | Jan. 7, 1947 |